Nov. 1, 1932.  W. H. PETIT ET AL  1,885,286
ROTARY CAMERA BACK
Filed Dec. 16, 1931  4 Sheets-Sheet 1
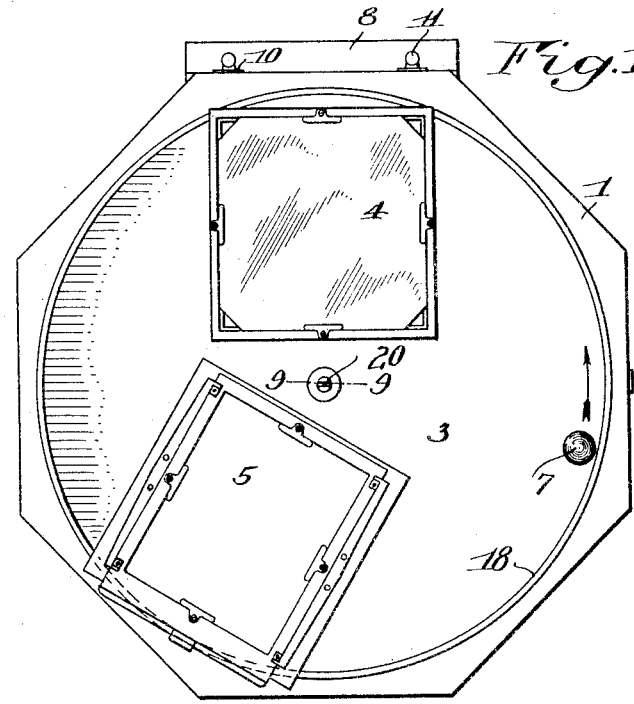
Fig.1
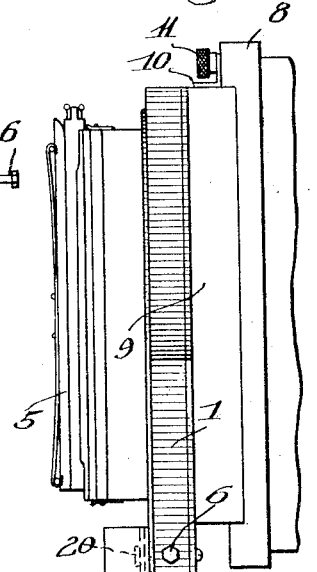
Fig.3
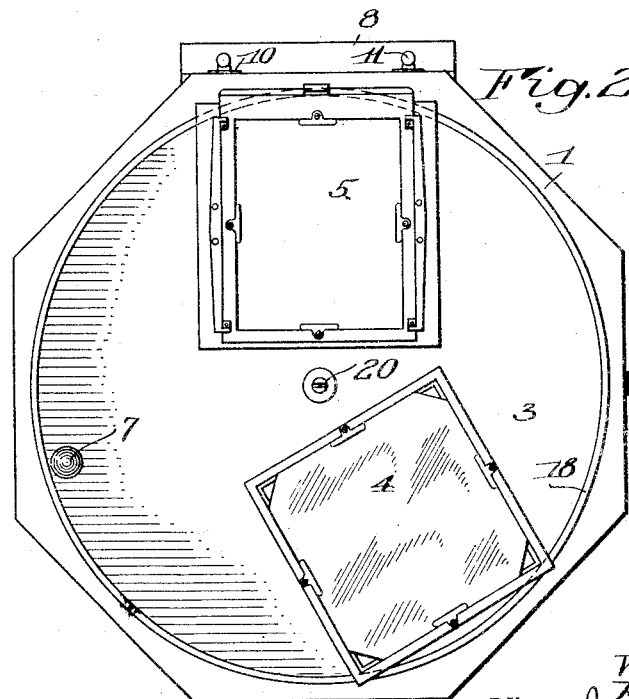
Fig.2
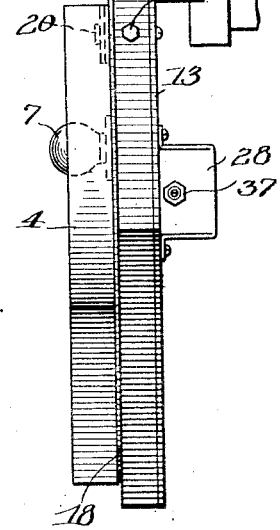
INVENTORS
William H. Petit
Edson S. Hineline
BY
their ATTORNEY

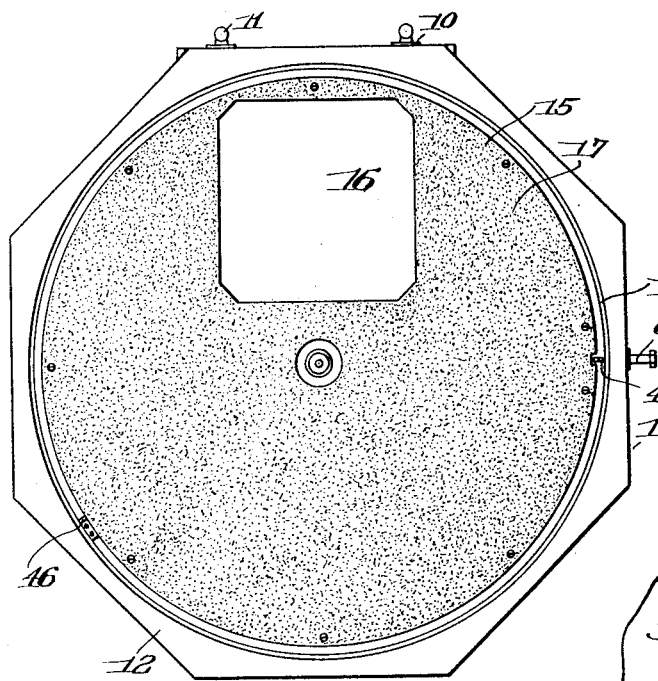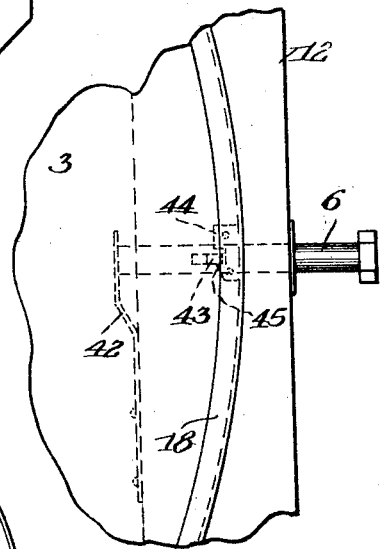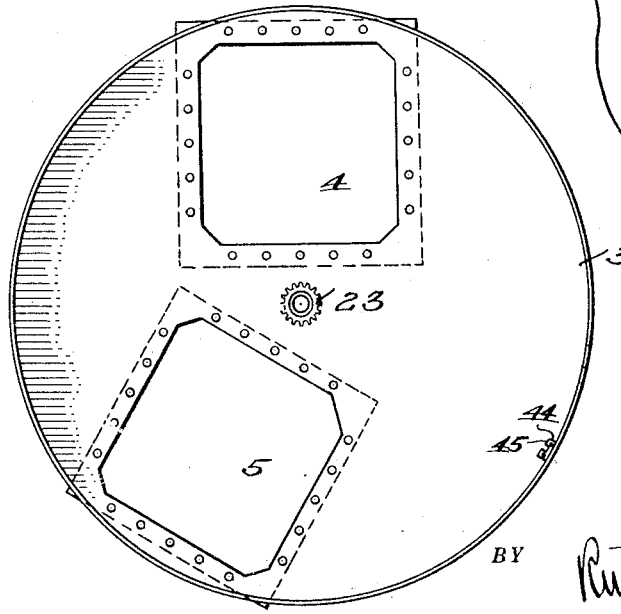

Nov. 1, 1932.   W. H. PETIT ET AL   1,885,286
ROTARY CAMERA BACK
Filed Dec. 16, 1931   4 Sheets-Sheet 3
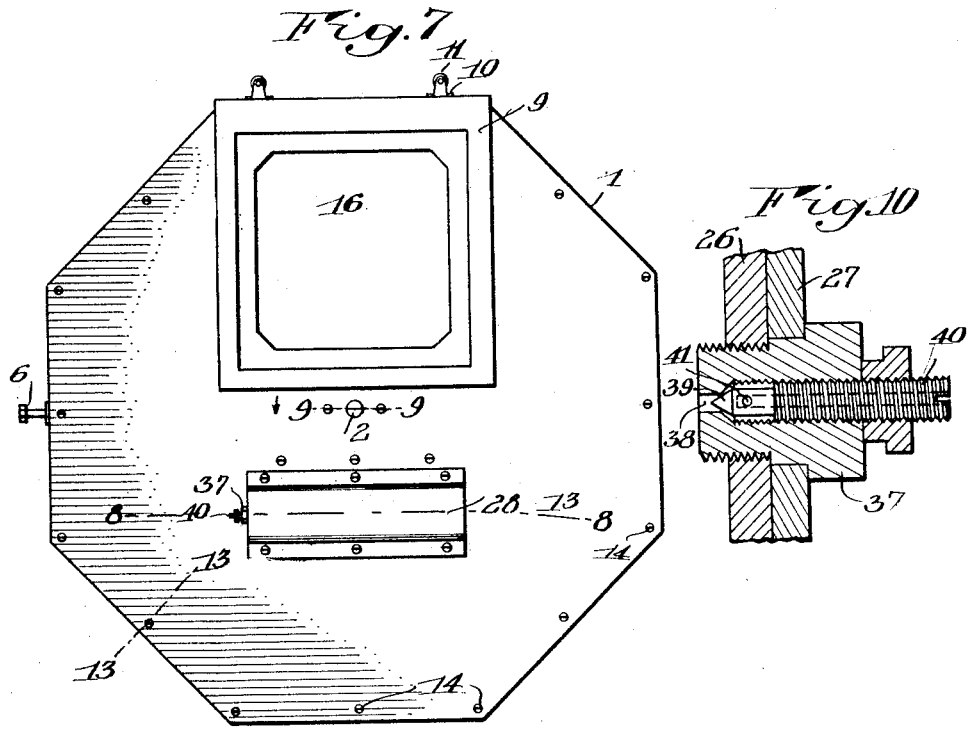
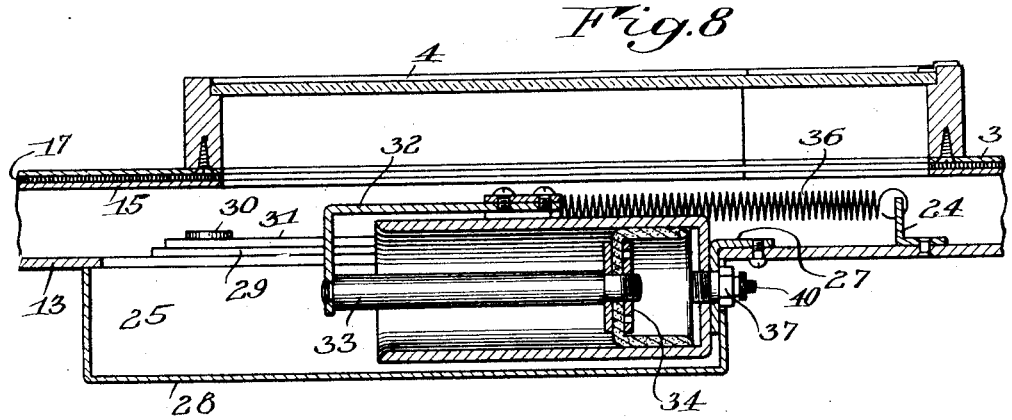
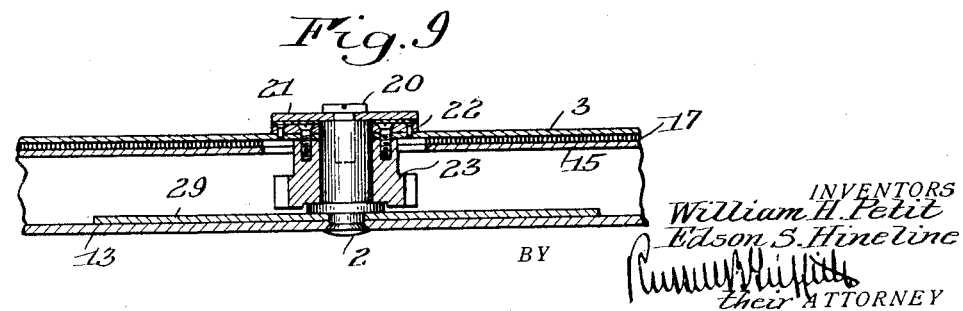
INVENTORS
William H. Petit
Edson S. Hineline
BY
their ATTORNEY

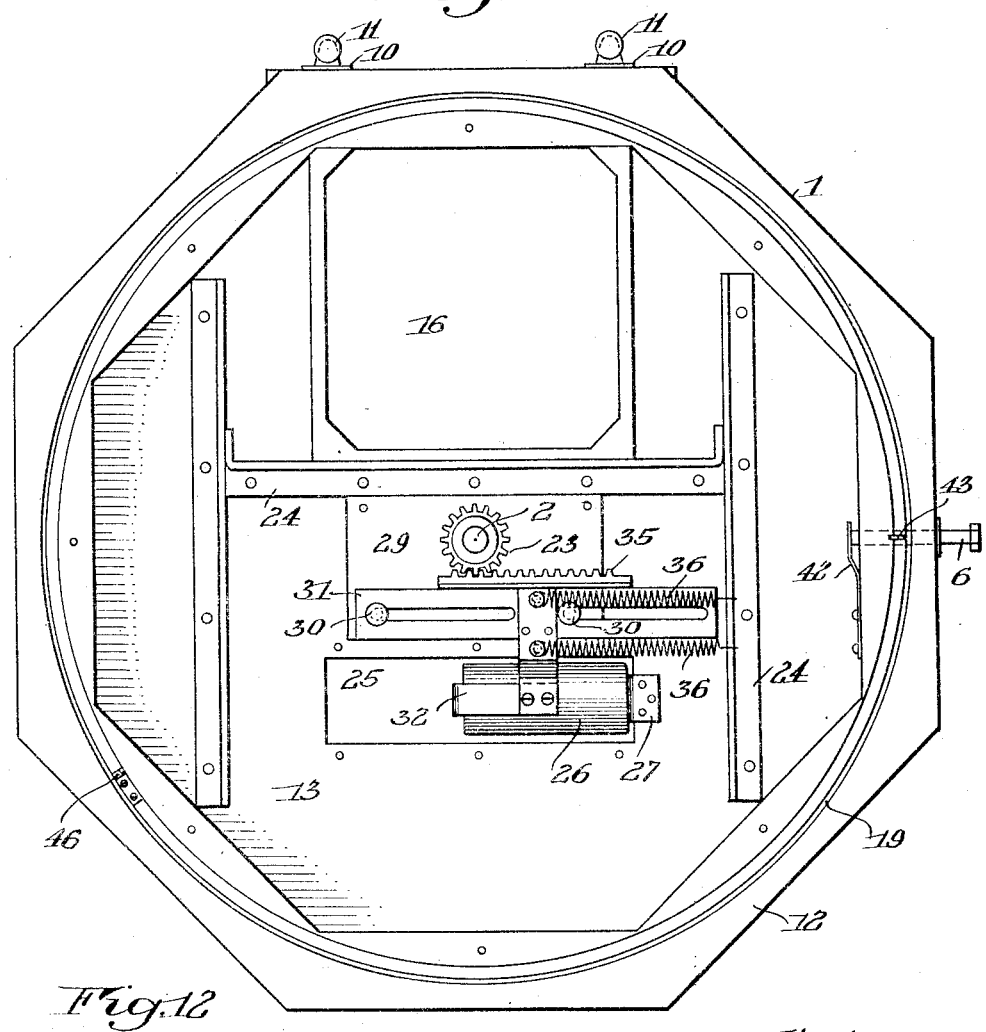
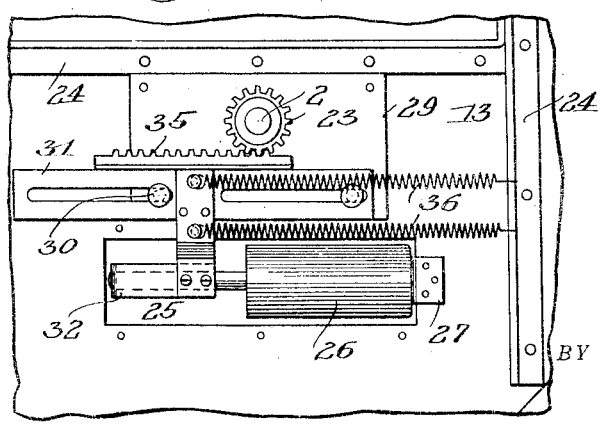
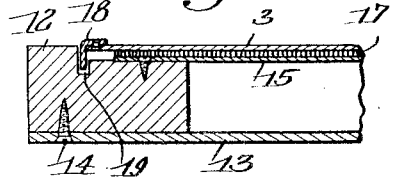

Patented Nov. 1, 1932

1,885,286

UNITED STATES PATENT OFFICE

WILLIAM H. PETIT AND EDSON S. HINELINE, OF ROCHESTER, NEW YORK, ASSIGNORS TO THE FOLMER GRAFLEX CORPORATION, OF ROCHESTER, NEW YORK, A CORPORATION OF DELAWARE

ROTARY CAMERA BACK

Application filed December 16, 1931. Serial No. 581,443.

Our present invention relates to photography and more particularly to photographic cameras, and it has for its object to provide a simple and conveniently operable rotary camera back offering certain facilities, whereby first a focusing screen and then a plate holder can be brought into register with an exposure opening in the axis of the camera lens. The invention is particularly adaptable to studio cameras which are large and heavy and in the use of which, after the proper pose of the subject has been focused, it is particularly desirable to change rapidly and substitute the plate holder for the focusing screen. The improvements are, therefore, directed in part toward providing a rapidly changing back that is definitely halted at the proper point but with equipment that avoids shock and jar. To this extent, it constitutes an improvement upon the invention set forth in our copending application, Serial No. 580,302, filed December 11, 1931.

To these and other ends, the invention resides in certain improvements and combinations of parts, all as will be hereinafter more fully described, the novel features being pointed out in the claims at the end of the specification.

In the drawings:

Fig. 1 is a rear elevation of a camera back constructed in accordance with and illustrating one embodiment of our invention with the parts in normal position, that is, with the focusing screen in operative position and the plate holder in inoperative position;

Fig. 2 is a similar view with the last mentioned elements interchanged as to the operative position;

Fig. 3 is an enlarged side view of the apparatus taken with a fragment of the rear of a camera to which it is attached;

Fig. 4 is a rear view of the mounting board with overlying parts removed;

Fig. 5 is a front view of the back plate proper removed from the mounting board of Fig. 4 but directionally reversed from its position of application thereto;

Fig. 6 is an enlarged fragmentary rear view of that portion of the back plate and mounting board carrying the stop latch;

Fig. 7 is a front view of the assembled apparatus;

Fig. 8 is an enlarged fragmentary horizontal section through the shock absorbing mechanism taken substantially on the line 8—8 of Fig. 7 but with the section directionally reversed;

Fig. 9 is an enlarged fragmentary section through the central bearing stud taken on the line 9—9 of Fig. 7;

Fig. 10 is an enlarged fragmentary section through a relief valve for the shock absorber, shown in elevation in Fig. 8;

Fig. 11 is an enlarged rear view of the mounting board corresponding to Fig. 4 but with the partition board removed;

Fig. 12 is a fragmentary view of the shock absorbing mechanism of Fig. 11 but with the parts in another position, and Fig. 13 is a fragmentary section, much enlarged, through the back board frame on the line 13—13 of Fig. 7.

Similar reference numerals throughout the several views indicate the same parts.

The construction of the accompanying embodiment of the invention will be better understood after a general description of the major elements and their mode of operation. Referring more particularly first to Figs. 1 and 2, 1 indicates a mounting board upon which is centrally pivoted by means of a stud 2 a rotary back plate 3 in the nature of a turntable. This back has suitably mounted thereon at substantially opposite sides of the pivot a ground glass focusing screen 4 and a plate holder 5. A spring, not visible in Figs. 1 and 2, tends to rotate the back 3 to the left or in the direction of the arrow, but the spring is restrained and the back held in the position of Fig. 1 by a spring latch 6. After the focusing has been accomplished on the screen 4, the latch 6 is released. The aforesaid spring rapidly shifts the back 3 from the position of Fig. 1 to that of Fig. 2, carrying the screen to an inoperative position and carrying the plate holder 5 to the operative position in the focal plane theretofore occupied by the screen and the exposure is made. The usual delay of withdrawing the screen and inserting the plate holder after focusing is thus avoided so that there is little time for the focused image to change before it is photographed.

To repeat the operation, the turntable back is moved to the right, retensioning the spring, and is again automatically caught and retained in the position of Fig. 1 by the latch 6, a knob 7 being provided for this purpose.

Referring more particularly to the drawings, the relationship of the back to the camera itself is illustrated in Fig. 3, where 8 designates the back frame of the camera body containing the exposure opening. At the top front of the mounting board 1 is a complementary frame 9 (Fig. 7) that fits the back frame 8 and is provided with brackets 10 carrying thumb screws 11, by means of which the two frames are secured together.

As shown in Figs. 4, 7 and 13, the mounting board 1 is built up of an octagonal frame 12 having a front covering plate 13 secured thereto by screws 14 and a rear cover plate 15 secured to the other side in the same manner to form a chamber. An opening 16 coincident and in register with the exposure opening in the back frame of the camera is provided in each plate. The rear plate 15 is covered with plush or the usual pile fabric 17 used in photography as a light sealing agent, so that the shutter of the plate holder 5 may be withdrawn when the latter is in inoperative position without fogging the plate. The back 3 rides against this plush and is provided at its rim with a flange 18 taking into a groove 19 in the frame 12 to intercept light at the margin.

The stud pivot 2 on which the back turns is shown in detail in Fig. 9, being riveted to the front plate 13, and the back 3 is held thereon by a screw 20 and washer 21. The latter engages another washer 22 fixed to the back and in turn secured to a pinion 23 turning on the stud. This is a part of the spring actuating mechanism for the back, which will now be described.

Within the cavity or chamber of the back board, as best shown in Fig. 11, is an angle iron frame 24 secured to and which stiffens the plate 13. The latter is provided with an opening 25 that is occupied by a dash pot cylinder 26 supported by a bracket 27 and housed at the front by a casing 28 (Fig. 7). A plate 29 associated with the frame 24 and through which the pivot stud extends supports a pair of headed guide pins 30. A slotted carriage plate 31 is adapted to reciprocate on these guide pins and is provided with an L-shaped bracket 32 connected to, or rather carrying, the rod 33 of a piston 34 operating in the dash pot 26 (see also Fig. 8). Fixed to the top of the carriage 31 is a rack bar 35, with which meshes pinion 23. Springs 36 having their ends connected, respectively, to the carriage and to the frame 24 tend to move the carriage to the right in Figs. 11 and 12 and, through rack 35, to rotate gear 23 and the back 3 to the left. They correspondingly press the dash pot piston 34 on its in-stroke.

With the back 3 in the position of Fig. 1, the spring actuating mechanism in the interior of the mounting board is in the position of Fig. 12, that is, the carriage 31 has been drawn to the left, the springs 36 are extended and energized and the piston 34 is extended in the dash pot. Upon tripping the spring latch 6, the springs draw the carriage 31 to the right and the rack bar turns the pinion 23 to rotate the back and interchange the screen 4 and plate holder 5 in the manner first described until the positions of Figs. 2 and 11 are reached. The resetting of the back by means of the knob 7 causes the gear 23, through the rack, to again energize the springs. The dash pot, in the first instance, permits a rapid initial movement that slows up quickly at the end and brings the back to a stop promptly but gently and without shock.

An adjustable relief valve 37 to regulate the compression and escape of the air is shown in detail in Fig. 10. It consists of a plug having a port 38 therein with a seat for a needle valve 39 having a stem 40 threaded centrally in the plug. The stem is tubular and opens laterally through a vent 41 to the valve chamber.

The spring latch 6 for retaining the back in the positions of Figs. 1 and 12 against the spring tension 36 is shown on an enlarged scale in Fig. 6. It consists of a plunger extending through the back board frame 12 and abutting a leaf spring 42 on the inner side of the frame and shown in dotted lines. A lateral locking projection 43 on the plunger lies in the path of a keeper plate 44 on the rim of the back, said keeper plate, as usual, embodying a cam surface 45 at its advance edge to momentarily displace the locking projection as it goes into position in the manner of spring latches.

When the latch is released and the spring mechanism rotates the back, the latter is halted at the proper point to bring the plate holder in exact register with the exposure openings in the camera frame and the mounting board by a stop 46 on the latter that is engaged by the keeper plate 44.

We claim as our invention:

1. In a camera back, the combination with a mounting board having an exposure opening in the axis of the camera lens, of a rotary back mounted on the board and provided with a focusing screen and with a plate holder revolvable with the back to selectively exchange operative position with respect to the exposure opening, a spring for rotating the back in one direction, and a dash pot operatively connected to the back to absorb the shock of the spring actuation.

2. In a camera back, the combination with a mounting board having a chamber therein and having an exposure opening in the axis of the camera lens, of a rotary back mounted on the board and provided with a focusing screen and with a plate holder revolvable with the back to selectively exchange operative position with respect to the exposure opening, a spring for rotating the back in one direction, and a dash pot occupying the chamber and operatively connected to the back to absorb the shock of the spring actuation.

3. In a camera back, the combination with a hollow mounting board having an exposure opening in the axis of the camera lens, of a rotary back mounted on the board and provided with a focusing screen and with a plate holder revolvable with the back to selectively exchange operative position with respect to the exposure opening, a pinion fixed axially to the back, and spring actuating mechanism within the mounting board for rotating the back in one direction through the medium of the gear.

4. In a camera back, the combination with a hollow mounting board having an exposure opening in the axis of the camera lens, of a rotary back mounted on the board and provided with a focusing screen and with a plate holder revolvable with the back to selectively exchange operative position with respect to the exposure opening, a pinion fixed axially to the back, spring actuating mechanism within the mounting board for rotating the back in one direction through the medium of the pinion, and a dash pot connected to the actuating mechanism to absorb the shock of the actuation and also occupying the interior of the mounting board.

5. In a camera back, the combination with a hollow mounting board having an exposure opening in the axis of the camera lens, of a rotary back mounted on the board and provided with a focusing screen and with a plate holder revolvable with the back to selectively exchange operative position with respect to the exposure opening, a pinion fixed axially to the back within the mounting board, a reciprocatory carriage in the latter embodying a rack meshing with the pinion, a spring for actuating the carriage in one direction, and a dash pot connected with the carriage to absorb the shock of the actuation.

WILLIAM H. PETIT.
EDSON S. HINELINE.